United States Patent [19]
Jones et al.

[11] Patent Number: 6,039,519
[45] Date of Patent: Mar. 21, 2000

[54] IMPACT-RESISTANT RESTRAINT FOR CARGO

[75] Inventors: John J. Jones, Los Angeles; Rosario S. Saggio, Arcadia; Karlton K. Okamoto, Lakewood; Isidor Lenoil, West Hills, all of Calif.

[73] Assignee: McDonnell Douglas Corporation, St. Louis, Mo.

[21] Appl. No.: 09/104,878

[22] Filed: Jun. 25, 1998

[51] Int. Cl.⁷ ...................................................... B60P 7/08
[52] U.S. Cl. ................................. 410/69; 410/77; 410/80
[58] Field of Search ................................. 410/77–80, 69, 410/94; 244/118.1; 248/500, 503

[56] References Cited

U.S. PATENT DOCUMENTS

| | | | |
|---|---|---|---|
| 3,693,919 | 9/1972 | Alberti et al. .............................. | 410/69 |
| 3,906,870 | 9/1975 | Alberti ...................................... | 410/79 |
| 4,498,823 | 2/1985 | Trautman .................................. | 410/84 |
| 4,583,896 | 4/1986 | Vogg et al. ............................... | 410/69 |
| 5,090,638 | 2/1992 | Eilenstein-Wiegmanns et al. . | |
| 5,098,038 | 3/1992 | Hruska et al. . | |
| 5,169,091 | 12/1992 | Beroth . | |
| 5,178,346 | 1/1993 | Beroth . | |
| 5,234,297 | 8/1993 | Wieck et al. .............................. | 410/77 |
| 5,265,991 | 11/1993 | Herrick et al. ............................ | 410/69 |
| 5,316,242 | 5/1994 | Eilenstein-Weigmann et al. . | |
| 5,346,161 | 9/1994 | Eilenstein-Weigmann et al. . | |
| 5,370,342 | 12/1994 | Nordstrom . | |
| 5,397,078 | 3/1995 | Eilenstein-Weigmann et al. . | |
| 5,489,172 | 2/1996 | Michler .................................... | 410/105 |
| 5,564,654 | 10/1996 | Nordstrom . | |
| 5,573,359 | 11/1996 | Moradians ................................ | 410/69 |
| 5,609,452 | 3/1997 | Looker et al. ............................ | 410/105 |
| 5,692,862 | 12/1997 | Hilde ......................................... | 410/69 |

Primary Examiner—Stephen T. Gordon
Attorney, Agent, or Firm—Alston & Bird LLP

[57] ABSTRACT

A cargo restraint includes a support, a housing which is rotatable relative to the support about a first rotation axis, and a plunger which is slidable within the housing along a second axis normal to the first axis, the plunger having a portion serving as a restraint for cargo. A torsion spring connects the housing to the support such that the housing is automatically rotatably urged into a predetermined deployed or cargo-engaging position, and a compression spring automatically urges the plunger into an extended cargo-engaging position. The restraint is thus self-deploying, and can resiliently yield to both direct and indirect impacts.

16 Claims, 3 Drawing Sheets

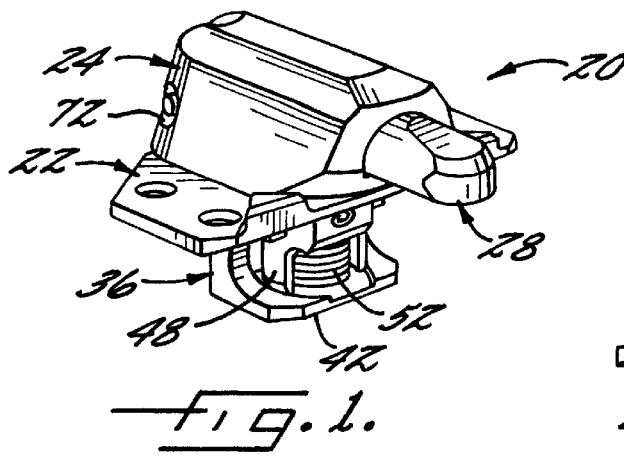
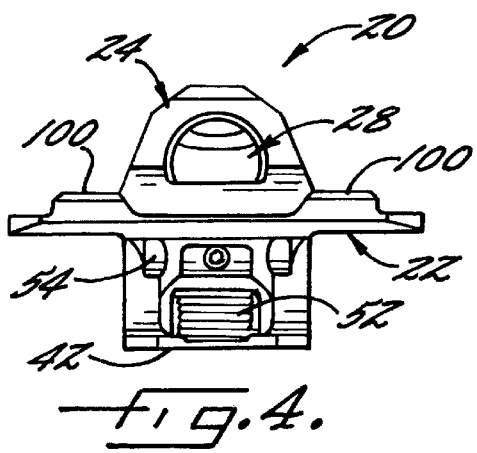
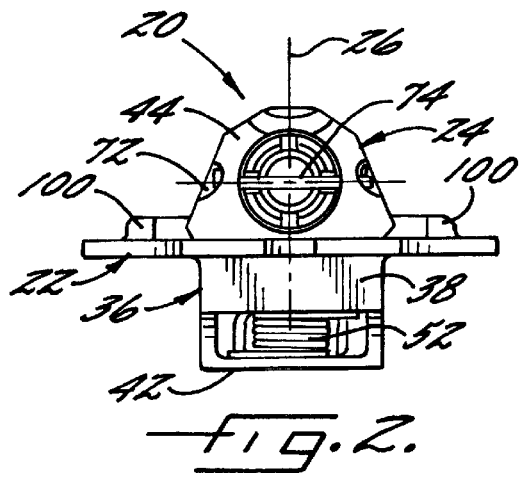
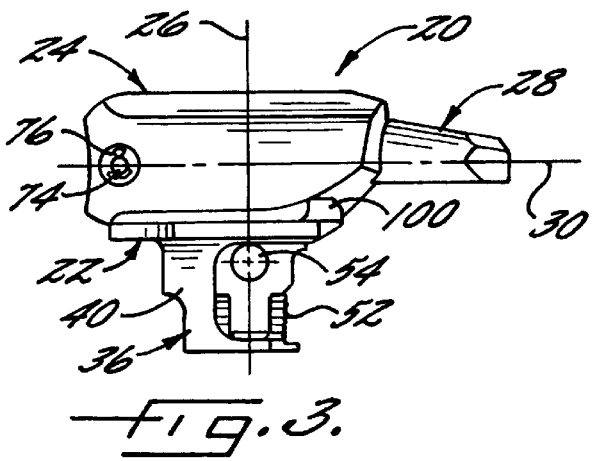
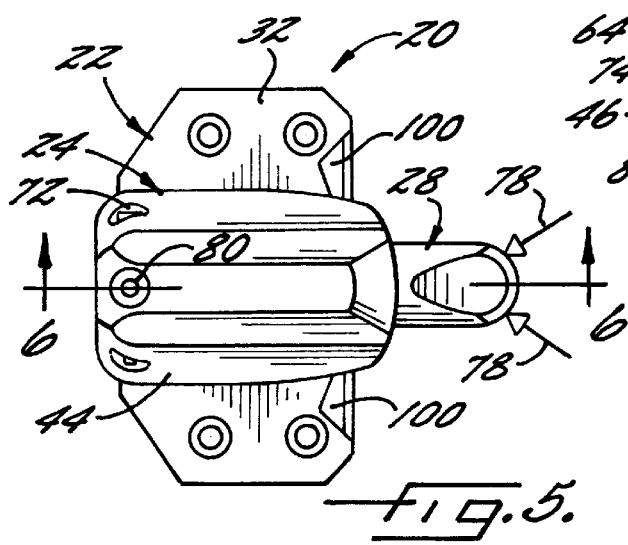
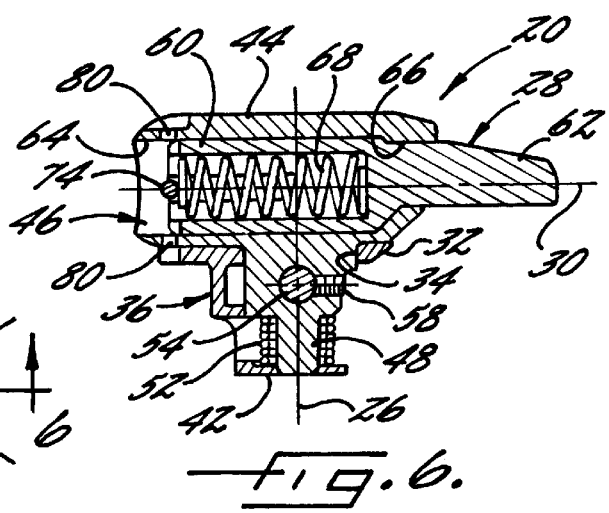

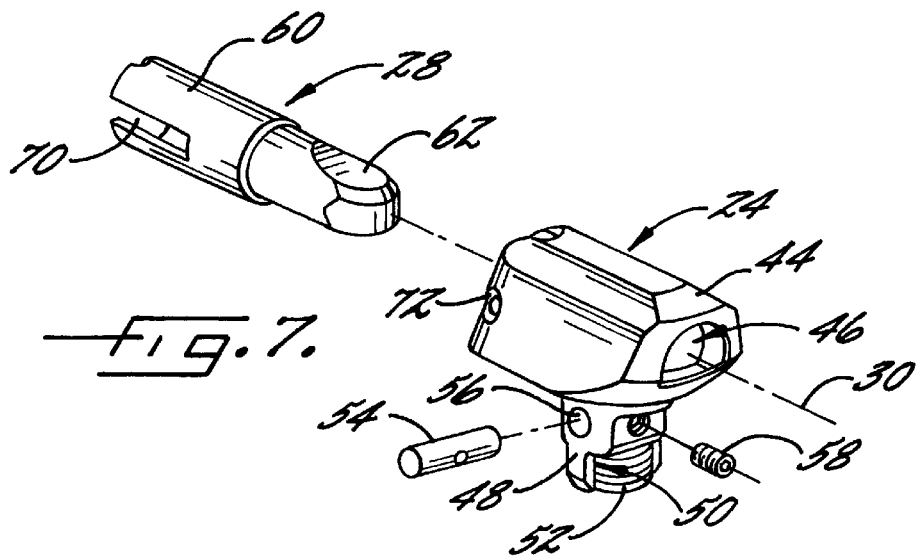
fig. 7.
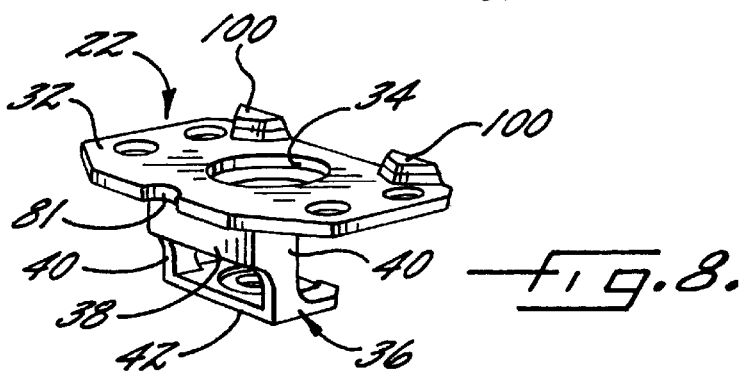
fig. 8.
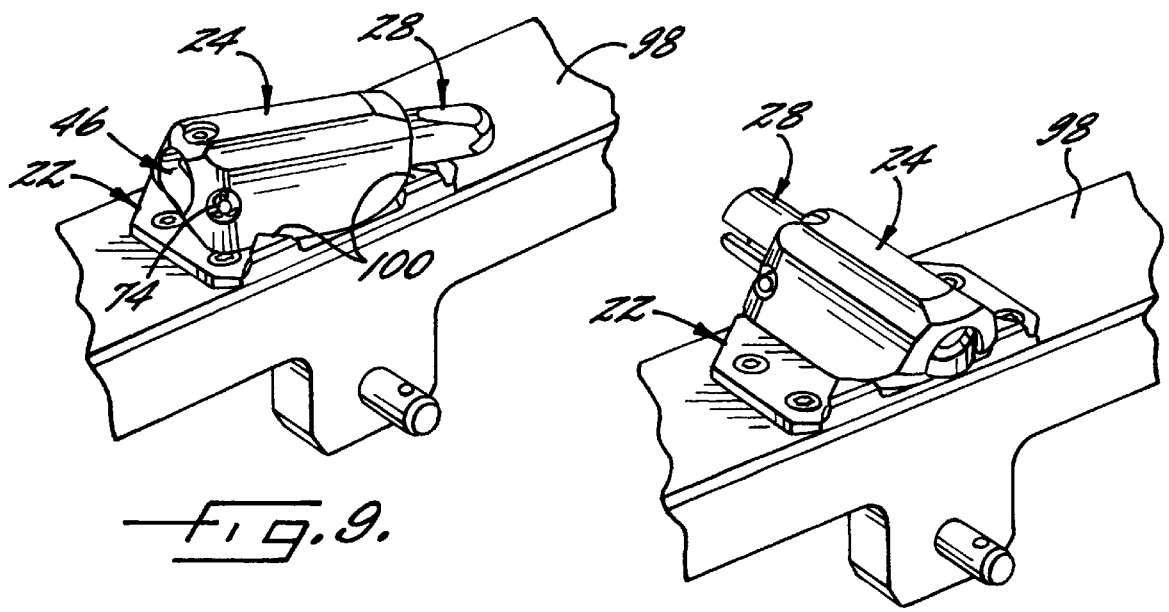
fig. 9.
fig. 10.

IMPACT-RESISTANT RESTRAINT FOR CARGO

FIELD OF THE INVENTION

The present invention relates to devices for restraining cargo items within a cargo compartment, such as the cargo compartment of an aircraft or other vehicle, during transit. More particularly, the invention relates to a device which is capable of vertically restraining cargo during transit, but which resiliently yields to impact loads which might occur during loading and unloading of the cargo.

BACKGROUND OF THE INVENTION

A wide variety of latches and other devices for restraining movement of cargo items are commonly used in aircraft cargo compartments for preventing items from moving about the compartment during flight. The latches are typically secured on rails or other structures which are affixed to the floor or deck of the cargo compartment. Typically a hook or the like is used for providing vertical restraint of a cargo item.

Currently commercially available vertical hold-down latches are not capable of resisting impacts in two different directions. Existing vertical restraint latches typically are pivotable about a single axis, usually about a horizontal axis so that the hook can be pivoted down below the floor level to permit cargo items to be rolled over the latch. Accordingly, when the hook is impacted by a moving cargo item in the fore-aft or side-to-side direction, either the hook or the cargo, or both may be damaged.

Additionally, many of the existing vertical restraint devices are mechanically complex and require a relatively large number of specially manufactured parts. As a result, these existing devices can be prone to reliability and maintainability problems, as well as relatively costly to manufacture.

Furthermore, some of the existing vertical restraint latches require manual operation to place them in their deployed latching position. This is a disadvantage in terms of time and efficiency of the loading and unloading process.

SUMMARY OF THE INVENTION

The present invention provides a cargo restraint suitable for vertically or otherwise restraining an item of cargo during transit, and capable of resiliently yielding to impact loads in two different mutually orthogonal directions such that loading and unloading of cargo can be accomplished without substantial risk of damage to the restraint or the cargo from such impact loads.

To these ends, the cargo restraint in one embodiment comprises a support adapted to be mounted to a vehicle structure, a housing mounted to the support such that the housing is rotatable relative to the support about a first axis, and a plunger mounted within the housing such that the plunger is slidable relative to the housing along a second axis which is generally perpendicular to the first axis. The plunger has a cargo-engaging end which projects outward from the housing in an extended position of the plunger. The plunger is restrained against relative movement except along the second axis, and accordingly is capable of supporting loads in the first axis direction. A first biasing member is connected between the housing and the support for biasing the housing into a predetermined deployed position relative to the support, and a second biasing member is connected between the housing and the plunger for biasing the plunger toward the extended position. Thus, the cargo restraint is capable of resiliently yielding to impact loads thereon such that cargo impacting the plunger generally along the second axis direction depresses the plunger into the housing, and cargo impacting the plunger generally along a third axis direction orthogonal to the first and second axes causes the housing to rotate about the first axis. The cargo restraint is also self-deploying such that upon cessation of impact loads thereon the housing automatically is urged into the deployed position and the plunger is urged into the extended position so that the plunger is capable of engaging cargo to prevent movement of the cargo along the first axis direction.

In a preferred embodiment of the invention, the housing includes a first portion having a generally cylindrical bore within which the plunger is slidably mounted and a generally cylindrical second portion which projects from the first portion with a longitudinal axis of the second portion generally normal to the axis of the bore. The support includes a support plate having an aperture through which the second portion of the housing is received such that the housing is rotatable in the aperture of the support.

The first portion of the housing rests upon one face of the support plate and the second portion of the housing is adjacent the other face of the support plate. Preferably, the device further comprises a mounting pin which extends transversely through the second portion and projects transversely outward therefrom. Thus, the mounting pin prevents the housing from being separated from the support. Additionally, the mounting pin supports loads imposed on the plunger in the first axis direction and transfers the loads to the support plate.

In accordance with a preferred embodiment, the housing includes a generally cylindrical bore within which the plunger is slidably mounted, and the plunger includes a generally cylindrical hollow portion residing in the bore and a cargo-engaging portion which is connected to the hollow portion and which projects outward from the bore in the extended position of the plunger. The second biasing means advantageously comprises a spring and is retained within the hollow portion of the plunger. The housing preferably includes a hole which passes through the housing and through the bore normal to the axis thereof, and the restraint further comprises a spring-retaining pin which extends through the hole and through the bore and engages the spring to retain the spring within the plunger. The hollow portion of the plunger includes longitudinal slots which receive the spring-retaining pin.

The housing preferably also includes a second hole which passes through the housing and through the bore normal to the axis thereof, the second hole being adjacent the end of the plunger which is within the bore, whereby the spring-retaining pin can be removed and inserted into the second hole so as to engage the end of the plunger to prevent the plunger from being depressed into the housing.

Additionally, the support preferably includes a recess which is engageable by the spring-retaining pin when the pin is installed in the second hole so as to fix the housing in the deployed position and prevent the housing from rotating about the first axis. Thus, in the event that either the first or second biasing means should break, the plunger can be secured in the extended position and the housing can be secured in the deployed position so that the cargo-restraining function of the restraint is not impaired.

The cargo restraint of the invention thus provides a restraint which is capable of preventing cargo movement along a first axis but which can resiliently yield to impact loads occurring along second and third axes mutually orthogonal to the first axis and to each other, so that probability of damage to the restraint or the cargo from such loads is reduced. Because the restraint is self-deploying, manual operation of latches is eliminated, thus improving loading and unloading efficiency. Additionally, the restraint has relatively few parts, only a few of which are specially manufactured items, and therefore is relatively simple to manufacture.

BRIEF DESCRIPTION OF THE DRAWINGS

The above and other objects, features, and advantages of the invention will become more apparent from the following description of a preferred embodiment thereof, when taken in conjunction with the accompanying drawings, in which:

FIG. 1 is a perspective view of a cargo restraint in accordance with one embodiment of the invention;

FIG. 2. is a rear elevational view of the cargo restraint of FIG. 1;

FIG. 3 is a side elevational view of the cargo restraint of FIG. 1;

FIG. 4 is a front elevational view of the cargo restraint of FIG. 1;

FIG. 5 is a top elevational view of the cargo restraint of FIG. 1;

FIG. 6 is a cross-sectional view taken on line 6—6 of FIG. 5;

FIG. 7 is an exploded view of a partial assembly of the cargo restraint of FIG. 1, showing the plunger, housing, and mounting pin;

FIG. 8 is a perspective view of the support of the cargo restraint of FIG. 1;

FIG. 9 is a perspective view of the cargo restraint according to one embodiment mounted on a rail, and showing the housing rotated from its deployed position;

FIG. 10 is a view similar to FIG. 9, showing the cargo restraint with the plunger in a depressed position;

DETAILED DESCRIPTION OF THE DRAWINGS

Figure 11:
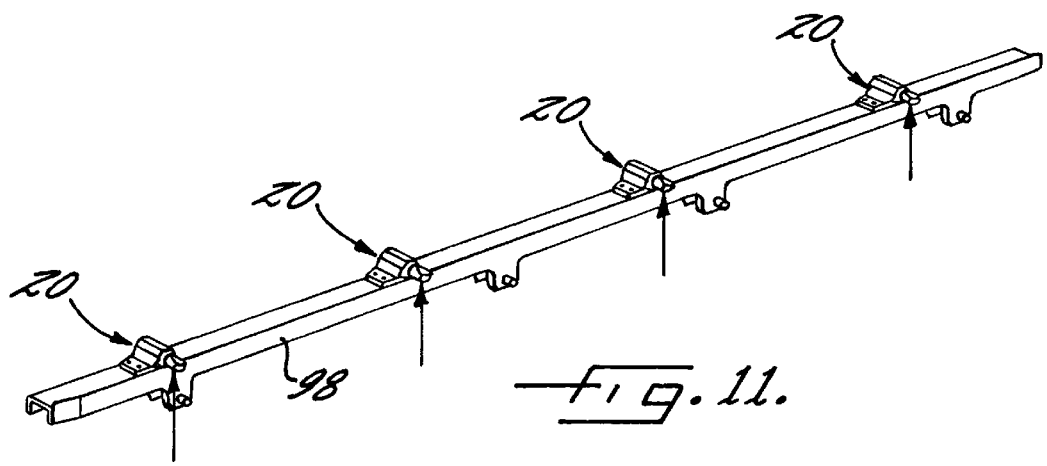
FIG. 11 is a perspective view of a rail on which four devices in accordance with one embodiment of the invention are mounted.

The invention is now explained by reference to a preferred embodiment thereof. It will be understood, however, that the invention is not limited to the embodiment illustrated and described herein.

With reference to FIGS. 1–6, there is shown a cargo restraint device 20 in accordance with one embodiment of the invention. While the cargo restraint device 20 is particularly advantageous for restraining cargo in an aircraft cargo compartment, the device 20 can also be employed in other vehicles such as rail cars, ships, trucks, and the like. The device 20 comprises a support 22, a housing 24 which is mounted on the support 22 so as to be rotatable about an axis 26 with respect to the support 22, and a plunger 28 which is mounted to the housing 24 and is slidable along an axis 30 which is perpendicular to the rotation axis 26.

With additional reference to FIG. 8, the support 22 comprises a support plate 32 having a circular aperture 34 therein, and an attachment member 36 which depends from a lower surface of the support plate 32 adjacent the aperture 34. The attachment member 36 comprises a rear wall 38 which is attached to the lower surface of the support plate 32 perpendicular thereto, a pair of spaced-apart side walls 40 which are attached to the lower surface of the support plate 32 and to opposite edges of the rear wall 38, and a bottom wall 42 which is attached to lower ends of the sidewalls 40 and is generally parallel to the support plate 32 and spaced therebelow. As described below, the support 32 is used to mount the cargo restraint device 20 to a rail or other attachment structure in a vehicle.

With reference to FIGS. 1–7, the housing 24 comprises a generally polygonally-shaped first portion 44 through which is formed a generally cylindrical bore 46, and a generally cylindrical second portion 48 which depends from the first portion 44 with the longitudinal axis 26 of the second portion 48 generally perpendicular to the axis 30 of the bore 46. The second portion 48 typically comprises a generally solid cylindrical member integrally joined at its upper end to the first portion 44 of the housing 24. The lower end of the cylindrical member is machined to define a space or cage 50 for retaining a torsion spring 52 therein.

The second portion 48 of the housing 24 is received through the circular aperture 34 in the support member 22, and the first portion 44 of the housing 24 rests upon the upper surface of the support plate 32. The lower end of the second portion 48 of housing 24 is adjacent the bottom wall 42 of the attachment member 36. The torsion spring 52 is secured at its upper end to the second portion 48 of housing 24, and the lower end of the torsion spring 52 is attached to the bottom wall 42 of attachment member 36. Advantageously, the spring 52 is attached such that in the spring's relaxed state the housing 24 assumes a predetermined deployed position with respect to the support 22 as shown in FIGS. 1–6. The circular aperture 34 in the support plate 32 permits the housing 24 to rotate about the axis 26 relative to the support 22, as shown in FIG. 9. The restoring force of the torsion spring 52 biases the housing 24 toward its deployed position whenever the housing is rotated in either direction about the axis 26.

The housing 24 and the support 22 are generally secured together by a mounting pin 54 which extends through a hole 56 formed through the second portion 48 of housing 24. The mounting pin 54 has a length greater than the outer diameter of the second portion 48 such that the opposite ends of the mounting pin 54 protrude from the opposite ends of the hole 56. A set screw 58 typically extends through a hole formed through the second portion 48 at a right angle to the hole 56 and engages the pin 54 to secure the pin in the hole 56.

With primary reference to FIGS. 6 and 7, the plunger 28 comprises a generally cylindrical member having a hollow cylindrical portion 60 and a cargo-engaging portion 62 that typically but not necessarily is solid. The hollow cylindrical portion 60 is larger in outside diameter than the cargo-engaging portion 62. Similarly, the bore 46 through the housing 24 has a first portion 64 of a first diameter slightly larger than the outer diameter of the hollow cylindrical portion 60, and a second portion 66 which is smaller in diameter than the first portion 64 and is slightly larger than the outer diameter of the cargo-engaging portion 62. The plunger 28 is inserted into the bore 46 so that the cargo-engaging portion 62 extends through the smaller second portion 66 of the bore 46, and such that the hollow cylindrical portion 60 of the plunger 28 is retained within the larger cylindrical portion 64 of the bore 46. The plunger 28 fits loosely enough within the housing 24 so that it is freely slidable along the axis 30.

A compression spring 68 (FIG. 6) is retained within the hollow cylindrical portion 60 of the plunger. The hollow portion 60 of the plunger preferably includes two longitudinally extending slots 70 which are diametrically opposite each other. Each of the slots 70 is aligned with a transversely extending hole 72 in the opposite sidewalls of the first portion 44 of housing 24. A pin 74 extends through the holes 72 and through the slots 70 and a cotter pin 76 is passed through a hole in one end of the pin 74 to secure the pin in position. The pin 74 retains the spring 68 within the plunger 28. The end of the spring 68 opposite from the pin 74 bears against an inner wall of the plunger 28. Thus, forces acting on the cargo-engaging portion 62 of the plunger having substantial force components along the axis 30, as indicated for example by arrows 78 in FIG. 5, will tend to depress the plunger 28 into the housing 24 as shown in FIG. 10, causing compression of the spring 68. The restoring force of the spring 68 acting between the pin 74 and the plunger 28 tends to urge the plunger 28 into the fully extended or deployed position as shown in FIGS. 1–6 so that the plunger is re-extended when the forces on the plunger are removed.

The first portion 44 of the housing also includes a hole 80 which extends through the bore 46 generally normal to the axis of the hole 72. In the event that the compression spring 68 breaks, the plunger 28 may be secured in its deployed position by removing the pin 74 from the hole 72 and inserting it through the hole 80 in the housing. In this position, the pin 74 engages the end of the plunger and prevents it from being depressed into the housing. Additionally, the support 22 includes a notch or recess 81 (FIG. 8) which is engaged by the pin 74 for preventing rotation of the housing 24 relative to the support 22. Thus, the device 20 may be secured in its deployed position so that it remains functional as a vertical restraint when either the spring 68 or the torsion spring 52 is broken.

Figure 12:
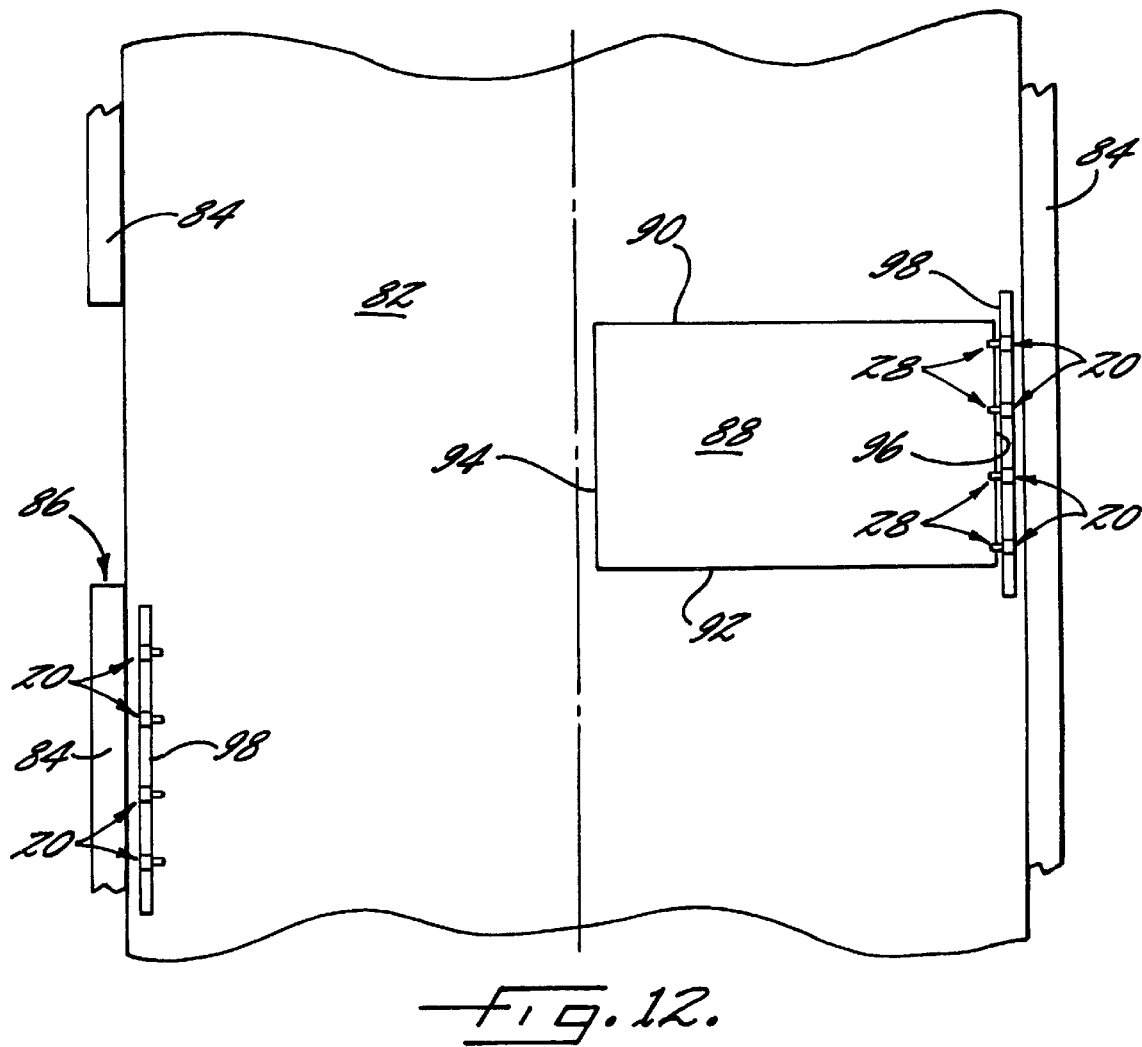
FIG. 12 is a schematic top elevational view of a cargo deck of an aircraft showing a pair of rails similar to that shown in FIG. 11 mounted in the cargo compartment.

FIGS. 9–12 depict an illustrative use of the device 20 of one advantageous embodiment for providing a vertical restraint for a cargo load within an aircraft cargo compartment. FIG. 12 schematically depicts a top elevational view of a portion of a cargo deck 82 of an aircraft disposed between opposite side walls 84 of the aircraft fuselage. A side doorway 86 is defined in one of the sidewalls 84. During transit, typically a plurality of cargo containers (not shown) are stored and secured within the cargo compartment of the aircraft. Each cargo container is typically affixed atop a pallet, indicated schematically as reference numeral 88 in FIG. 12. A plurality of latches (not shown) are typically employed for securing the pallet 88 and cargo container in the fore-aft, side-to-side, and vertical directions along the forward edge 90, the aft edge 92 and the side edge 94 of the pallet closest to the longitudinal centerline of the aircraft. The outboard side edge 96 of the pallet 88 is secured in the vertical direction by the devices 20 of the present invention. A plurality of devices 20 are mounted on a rail 98 which is secured to the aircraft structure on the opposite side of the aircraft from the doorway 86. The axis 30 of the plunger 28 of each device is transversely oriented in the deployed position of the device 20. As shown, the cargo compartment may also include one or more additional rails 98 with the devices 20 along the same or the opposite side of the aircraft.

A cargo container on a pallet 88 is moved along the cargo deck 82 into the position shown in FIG. 12, the outboard side edge 96 of the pallet sliding underneath the plungers 28 of the devices 20. Thus, the plungers 28 provide a vertical restraint preventing the pallet 88 from moving upward at the outboard side edge 96. During the unloading and loading process, if the pallet 88 impacts a device 20 in a forward or aft direction, the device 20 resiliently yields in the rotational direction as shown in FIG. 9. The support 22 includes a pair of stops 100 which limit the extent to which the housing 24 can rotate relative to the support 22. Should the pallet 88 impact the device 20 primarily in the side-to-side or transverse direction, the plunger 28 is depressed within the housing 24 as shown in FIG. 10. Once the disturbing forces are removed, the device 20 is self deploying to its deployed position providing the vertical restraint function. By resiliently yielding to both indirect impacts (i.e., impacts in a fore or aft direction) and direct impacts (i.e., impacts in a transverse or side-to-side direction along the axis of the plunger), the device can tolerate such impacts without breaking and without damaging the cargo. Additionally, as previously noted, should the compression spring 68 or the torsion spring 52 break, the pin 74 may be removed from the hole 72 and placed in the hole 80 to secure the device 20 in the deployed position. Thus, a failure of the springs will not prevent the device from being able to provide its vertical restraint function.

While the invention has been described by reference to a preferred embodiment thereof, and while this embodiment has been described in considerable detail, it is to be understood that the invention is not limited to the embodiment illustrated and described herein. For example, while the shapes of the various components of the cargo restraint device of the present invention have been described for purposes of explanation, the components of the device 20 can have a number of other shapes without departing from the scope of the present invention. Additionally, although the cargo restraint device 20 has been described as including a support mounted to a vehicle structure such as a rail, floor, or the like, the housing 24 of the cargo restraint device 20 instead can be rotatably mounted directly to the vehicle structure if the vehicle structure is appropriately constructed so as to include an aperture for receiving the second portion 48 of the housing 24. Furthermore, while the cargo restraint device 20 has been described as a vertical restraint, it will be appreciated that the device is capable of functioning as a restraint in other directions by suitably mounting the device in the appropriate orientation relative to the vehicle. Thus, various modifications and/or substitutions of equivalents can be made without departing from the scope of the invention as set forth in the appended claims.

What is claimed is:

1. A device for restraining cargo from movement along a first axis, comprising:

a support adapted to be mounted to a vehicle structure;

a housing mounted to the support such that the housing is rotatable relative to the support about the first axis, the housing being adapted to be generally secured in a predetermined deployed position relative to the support;

a plunger mounted within the housing such that the plunger is slidable relative to the housing along a second axis which is generally perpendicular to the first axis, the plunger having a cargo-engaging end which projects outward from the housing in an extended position of the plunger, the plunger being substantially restrained against movement relative to the housing except along the second axis; and a plunger-biasing member connected between the housing and the plunger for biasing the plunger toward the extended position;

the device resiliently yielding to impact loads thereon such that cargo impacting the plunger generally along the second axis direction depresses the plunger into the housing, and cargo impacting the plunger generally along a third axis direction orthogonal to the first and second axes causes the housing to rotate about the first axis, the plunger being self-deploying such that upon cessation of impact loads thereon the plunger is urged into the extended position so that the plunger is capable of engaging cargo to prevent movement of the cargo along the first axis direction.

2. The device of claim 1, further comprising a housing-biasing member connected between the housing and the support for biasing the housing into the predetermined deployed position, such that the housing is automatically self-deployed to said deployed position in the absence of loads thereon tending to rotate the housing from said deployed position.

3. The device of claim 1, wherein the housing includes a first portion defining a lengthwise-extending bore within which the plunger is slidably mounted and a second portion which projects from the first portion with a longitudinal axis of the second portion generally normal to a longitudinal axis of the bore, and wherein the support includes a support plate having an aperture through which the second portion of the housing is received such that the housing is rotatable in the aperture of the support.

4. The device of claim 3, wherein the first portion of the housing rests upon one face of the support plate and the second portion of the housing is adjacent an opposite face of the support plate, the device further comprising a mounting pin which extends transversely through the second portion and projects transversely outward therefrom, the mounting pin supporting loads imposed on the plunger in the first axis direction and transferring said loads to the support plate.

5. The device of claim 1, wherein the housing defines a lengthwise-extending bore having at least one open end, the plunger being slidably mounted in the bore, and wherein the plunger includes a hollow portion residing in the bore and a cargo-engaging portion which is connected to the hollow portion and which projects outward from the open end of the bore in the extended position of the plunger, the plunger-biasing member comprising a spring and being retained within the hollow portion of the plunger.

6. The device of claim 5, wherein the housing defines a first hole which opens into the bore and defines an axis generally normal to the longitudinal axis of the bore, and wherein the device further comprises a spring-retaining pin which extends through the first hole and into the bore and engage the spring to retain the spring within the plunger, the hollow portion of the plunger including at least one longitudinal slot which receives the spring-retaining pin.

7. The device of claim 6, wherein the plunger in the extended position thereof has a second end opposite from the cargo-engaging end that is disposed within the bore, and wherein the housing defines a second hole which also opens into the bore and defines an axis generally normal to the longitudinal axis of the bore, the second hole being adjacent the second end of the plunger which is within the bore in the extended position of the plunger, whereby the spring-retaining pin can be removed from the first hole and inserted into the second hole so as to engage the second end of the plunger to prevent the plunger from being depressed into the housing.

8. The device of claim 7, wherein the support includes a recess which is engageable by the spring-retaining pin when said pin is installed in the second hole so as to fix the housing in the deployed position and prevent the housing from rotating about the first axis.

9. The device of claim 2, wherein the housing-biasing member comprises a torsion spring.

10. The device of claim 1, wherein the plunger-biasing member comprises a compression spring.

11. The device of claim 1, wherein the support includes at least one stop for limiting the extent of rotational movement of the housing.

12. A cargo restraint device comprising:
a housing adapted to be mounted to a structure affixed to a vehicle such that the housing is rotatable relative to the structure about a first axis, the housing being adapted to be generally secured in a predetermined deployed position relative to the structure;
a plunger mounted within the housing such that the plunger is slidable relative to the housing along a second axis which is generally perpendicular to the first axis, the plunger having a cargo-engaging end which projects outward from the housing in an extended position of the plunger, the plunger being substantially restrained against movement relative to the housing except along the second axis; and
a plunger-biasing member connected between the housing and the plunger for biasing the plunger toward the extended position;
the device resiliently yielding to impact loads thereon such that cargo impacting the plunger generally along the second axis direction depresses the plunger into the housing, and cargo impacting the plunger generally along a third axis direction orthogonal to the first and second axes causes the housing to rotate about the first axis, the plunger being self-deploying such that upon cessation of impact loads thereon the plunger is urged into the extended position so that the plunger is capable of engaging cargo to prevent movement of the cargo along the first axis direction.

13. The device of claim 12, further comprising a housing-biasing member connected to the housing and adapted to be affixed to the structure, the housing-biasing member resiliently urging the housing into the predetermined deployed position in the absence of loads on the device tending to rotate the housing away from said deployed position.

14. The device of claim 13, wherein the housing includes a first portion defining a lengthwise-extending bore within which the plunger is slidably mounted and a second portion which projects from the first portion with a longitudinal axis of the second portion generally normal to a longitudinal axis of the bore, the second portion being adapted to be rotatably mounted to the structure affixed to the vehicle such that the housing is rotatable about the first axis.

15. The device of claim 14, wherein the plunger includes a first portion residing in the bore and a second portion which is connected to the first portion and which projects outward from the bore in the extended position of the plunger, the plunger-biasing member comprising a spring and being retained within the housing so as to act on the first portion of the plunger for biasing the plunger toward the extended position.

16. The device of claim 15, wherein the housing defines a hole which opens into the bore and defines an axis generally normal to the longitudinal axis of the bore, and wherein the device further comprises a spring-retaining pin which extends through the hole and into the bore and engages the spring to retain the spring within the housing.

* * * * *